United States Patent [19]

Hirt et al.

[11] 4,169,519
[45] Oct. 2, 1979

[54] LUBRICATING DEVICE FOR TRANSMISSIONS OR THE LIKE IN STARTING CONDITION

[75] Inventors: Manfred Hirt, Munich; Wolfgang Leiber, Oberweikertshofen, both of Fed. Rep. of Germany

[73] Assignee: Carl Hurth Maschinen-und Zahnradfabrik, Munich, Fed. Rep. of Germany

[21] Appl. No.: 880,900

[22] Filed: Feb. 24, 1978

[30] Foreign Application Priority Data

Apr. 7, 1977 [DE] Fed. Rep. of Germany ....... 2715771

[51] Int. Cl.² .............................................. F01M 9/00
[52] U.S. Cl. ..................... 184/6.3; 184/6.12
[58] Field of Search ............... 184/6.3, 6.1, 6.12, 184/6 R, 7 R, 13 R, 11 R, 11 A; 74/467; 123/196 S

[56] References Cited

U.S. PATENT DOCUMENTS

| | | | |
|---|---|---|---|
| 1,987,303 | 1/1935 | McVeigh | 184/6.3 |
| 2,026,662 | 1/1936 | Watson | 184/6.3 |
| 2,069,826 | 2/1937 | Frank | 184/6.3 |
| 3,618,711 | 11/1971 | Vollmer | 184/6.12 |

*Primary Examiner*—David H. Brown

*Attorney, Agent, or Firm*—Blanchard, Flynn, Thiel, Boutell & Tanis

[57] ABSTRACT

A lubricating device for use with transmission gearing, particularly in the starting phase of the transmission. A pair of oil reservoirs are provided with one being located higher than the other. The upper reservoir contains the transmission gearing therein. A pair of vertically spaced outlets are provided in the upper reservoir with both outlets being connected in fluid circuit with the lower reservoir. The fluid circuit for the lower outlet includes a valve controlling the flow of oil between the upper and lower reservoirs in response to the fluid pressure produced by a pump. The transmission gearing is immersed in the oil when the lower outlet is blocked by the valve, which will occur when the pump is off. When the pump is activated, the valve is opened in response to the pressure produced by the pump and the oil level in the upper reservoir will drop due to a gravity feed thereof to the lower reservoir through the valve to the level of the lower outlet so that the gearing will no longer be immersed in oil. By this time, however, the pump will be supplying adequate oil to lubricate the transmission gearing through a nozzle arrangement. The volume of oil in the nozzle arrangement is sufficient, when the pump is deactivated, to fill the upper reservoir up to the upper outlet level to again immerse the gearing in oil in readiness for a new start-up operation for the transmission gearing.

4 Claims, 1 Drawing Figure

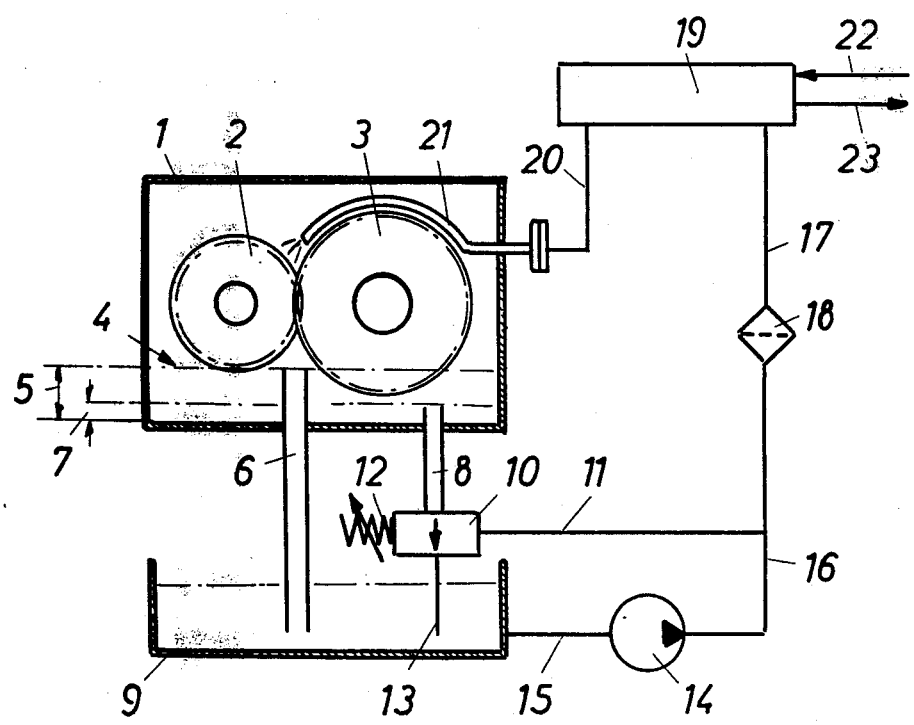

LUBRICATING DEVICE FOR TRANSMISSIONS OR THE LIKE IN STARTING CONDITION

FIELD OF THE INVENTION

The invention relates to a lubricating device and, more particularly, to an arrangement for assuming that the gearing of a transmission is sufficiently lubricated during a startup phase of operation.

BACKGROUND OF THE INVENTION

A lubricating device for the starting condition is already known and has a lubricant storage tank, the outlet of which is opened by means of an electromagnet during the starting phase of operation. This causes oil to be fed to the transmission, still prior to the oil pump becoming effective. This device operates actually satisfactorily, however, it is not suited for larger transmissions and expanded line systems (because of the long time it takes the pump to become effective), because the volume of freely flowing oil is not sufficient. Furthermore, a current source is not always available for the electromagnetic valve (German Pat. No. 1,291,966).

Therefore, the basic purpose of the invention is to provide a lubricating device of the above-described type which permits the transmission to drive a practically unlimited time with a practically sufficient lubricant volume. This is done according to the invention with a plunge or splash type of lubrication. Since this plunge lubrication results in splash losses and can also have other disadvantages for some cases of application, it is a further purpose to automatically switch over to a pressure-spray or an atomization of the lubricant or the like. Furthermore, a separate energy supply for the electromagnetic pilot valve or the like is supposed to be avoided.

SUMMARY OF THE INVENTION

The objects and purposes of the invention are met by providing a pair of oil reservoirs, one located higher than the other, the upper one containing transmission gearing therein. A pair of vertically spaced outlets are provided in the upper reservoir with both outlets being connected in fluid circuit with the lower reservoir. The fluid circuit for the lower outlet includes a valve for controlling the flow of oil between the reservoirs in response to the fluid pressure produced by a pump. The gearing is immersed in the oil when the lower outlet is blocked by the valve, which will occur when the pump is off. When the pump is activated, the valve is opened in response to the pressure produced thereby and the oil in the upper reservoir drops to the level of the lower outlet. By this time, however, the pump will be supplying adequate oil to the gearing through a nozzle arrangement. The volume of oil in the nozzle arrangement is sufficient, when the pump is deactivated, to fill the upper reservoir up to the upper outlet level to again immerse the gearing in oil in readiness for a new start-up operation.

Communicating pipes or the like are to be included within the meaning of the phrase "free gravity fall or feed".

Further advantages and characteristics of the invention can be taken from the following description.

BRIEF DESCRIPTION OF THE DRAWINGS

The invention is discussed with reference to a schematically illustrated exemplary embodiment.

DETAILED DESCRIPTION

A transmission housing has the reference numeral 1 in the drawing and has a number of transmission elements for example gears rotatingly supported therein. A lubricant sump, hereinafter referred to as oil sump 4, is provided in the transmission housing. The oil level in the oil sump 4 can have an upper level or depth 5, which is determined by a first overflow pipe 6. In addition, a lower level or depth 7 is provided which is determined by a second overflow pipe 8.

It is to be understood that the pipes and lines which are directly connected to the transmission housing 1 are shown with conventional drawing representation, however, all other pipes and lines are illustrated schematically by single lines.

The first overflow pipe 6 extends directly into a storage tank 9, namely in such a manner that the oil from the oil sump 4 flows in a free gravity feed manner to the storage tank. The second overflow pipe extends first of all to a pressure valve 10 having a not shown slide valve or the like therein. The slide valve is biased at the one end by the fluid pressure on a line 11 connected to a fluid system described hereinbelow and, at the other end, is biased by an adjustable spring 12. Such pressure valves are conventional and commercially available and, therefore, not described in any further detail. The second overflow pipe 8 is connected through the pressure valve 10 and through a discharge line 13 into the storage tank 9.

The fluid system mentioned above includes a pump 14 which draws the lubricant, in the example oil, through a suction line 15 from the storage tank 9 and forces it under pressure through pressure lines 16, 17, a filter element 18, an oil cooler 19 and a supply line 20 into the transmission housing 1, where it is distributed by means of lubricating lines 21.

The above-mentioned line 11 extends between the pressure line 16 and the pressure valve 10 and, therefore, the fluid supplied thereto is pressurized by the pump 14. The oil cooler is connected to cooling lines 22, 23 through which flows a coolant.

The size of the supply line 20 is dimensioned such that and is arranged such that, after the pump 14 is turned off, a volume of oil is fed to the transmission housing 1 which is sufficient to fill the oil sump 4 from the lower level 7 to the upper level 5. This will be possible since line 11 is no longer pressurized and the valve 10 will close to block the flow of oil from the oil sump 4 to the storage tank 9. The volume housed in the line 20 may be varied by a not illustrated reservoir connected in circuit therewith.

The pump 14 can be driven as desired. It is particularly preferable for the pump to be driven synchronously with and by the transmission gears 2, 3. The pump does not need to run any longer than the transmission gearing since the oil storage in the sump is filled up independent from the pump.

The oil for the oil sump 4 runs to the transmission from the supply line free gravity feed. Should the line system be so airtight that the oil does not leave the lubricating line 21 by a free gravity fall, a suitable ventilation system is provided, such as a check valve to the outside atmosphere which becomes closed to the atmosphere upon the occurrence of a pressure in the line system and opens up to the atmosphere for ventilation in response to a drop in the pressure due to a stopping of the pump.

After a starting of the transmission gearing, the gearing runs practically as long as desired by a plunge or splash type of lubrication caused by the gearing being at least partially immersed in the oil in oil sump 4 (upper level 5). Only after the pump has built up a sufficient pressure for the pressure or spray lubrication from the line 21, the oil in the sump is drained off to the lower level 7 caused by an opening of the valve 10, so that the transmission operates then without plunge losses.

Although a particular preferred embodiment of the invention has been disclosed in detail for illustrative purposes, it will be recognized that variations or modifications of the disclosed apparatus, including the rearrangment of parts, lie within the scope of the present invention.

The embodiments of the invention in which an exclusive property or privilege is claimed are defined as follows:

1. A lubricating device for lubricating gears in a transmission housing during an initial starting condition phase of operation thereof, said lubricating device comprising:
   a storage tank housing lubricant therein;
   an oil pump having an inlet port and an outlet port, said inlet port being connected in fluid circuit with said storage tank;
   a normally closed pressure responsive valve having control means responsive to a fluid pressure from said pump above a predetermined threshold value to effect an opening of said valve, said control means being connected in fluid circuit with said outlet port;
   sump means in said transmission housing;
   a first overflow pipe connecting said sump means to said storage tank and including first means establishing an upper lubricant level into which at least one gear is rotated;
   a second overflow pipe connecting said sump means to said storage tank and including second means establishing a lower lubricant level below the level of said one gear;
   third means connecting said outlet port to a further location adjacent said one gear in said transmission housing, said pump effecting a pumping of said lubricant from said storage tank into said transmission housing to effect a pressurized spray of lubricant onto said one gear; and
   said pressure responsive valve being connected in line of said second overflow pipe, said valve becoming opened in response to a fluid pressure from said outlet port of said pump attaining and exceeding said predetermined threshold value to effect a connection between said sump and said storage tank to cause a lowering of the level of lubricant in said transmission housing to said lower lubricant level.

2. A lubricating device according to claim 1, wherein said pressure responsive valve includes fourth means for adjusting the pressure response level thereof.

3. A lubricating device according to claim 1, wherein said outlet port of said pump is connected to fourth means arranged to house a specific volume of lubricant above said transmission housing, said specific volume of lubricant entering said transmission housing following a stopping of said pump, such that the difference between said second and said first lubricant levels is filled.

4. A lubricating device according to claim 3, wherein said pressure responsive valve effects a lubricant flow from said sump means to said storage tank through a free gravity fall.

* * * * *